United States Patent

Boutaghou et al.

Patent Number: 5,343,340
Date of Patent: Aug. 30, 1994

[54] DIGITAL SERVO SIGNAL DEMODULATION METHOD AND APPARATUS UTILIZING A PARTIAL-RESPONSE MAXIMUM-LIKELIHOOD (PRML) CHANNEL IN A DISK FILE

[75] Inventors: Zine-Eddine Boutaghou; Dana H. Brown; Kevin J. Erickson; Richard Greenberg, all of Rochester, Minn.

[73] Assignee: International Business Machines Corporation, Armonk, N.Y.

[21] Appl. No.: 999,309

[22] Filed: Dec. 31, 1992

[51] Int. Cl.$^5$ .............................................. G11B 5/596
[52] U.S. Cl. .............................. 360/77.08; 360/78.06
[58] Field of Search ....................... 360/51, 46, 29, 53, 360/77.01, 77.08, 78.14, 78.08, 77.07, 78.06, 78.09

[56] References Cited

U.S. PATENT DOCUMENTS

| | | | |
|---|---|---|---|
| 3,534,344 | 10/1970 | Santana | 340/174.1 |
| 3,691,543 | 9/1972 | Mueller | 340/174.1 |
| 4,488,189 | 12/1984 | Axmeon et al. | 360/78.06 X |
| 4,530,019 | 7/1985 | Penniman | 360/77 |
| 4,549,232 | 10/1985 | Axmeon et al. | 360/77.07 |
| 4,737,869 | 4/1988 | Sugaya et al. | 360/77 |
| 4,786,890 | 11/1988 | Marcus et al. | 341/81 |
| 4,853,915 | 8/1989 | Takasago et al. | 360/29 X |
| 5,021,894 | 6/1991 | Naito et al. | 360/46 |
| 5,027,230 | 6/1991 | Nakayama | 360/32 X |
| 5,099,367 | 3/1992 | Sideman | 360/77.08 |
| 5,136,439 | 8/1992 | Weisfenning et al. | 360/77.08 |
| 5,170,299 | 12/1992 | Moon | 360/51 X |
| 5,182,682 | 1/1993 | Weisfenning et al. | 360/77.08 |
| 5,220,466 | 6/1993 | Coker et al. | 360/51 X |

FOREIGN PATENT DOCUMENTS 2246060 7/1986 Japan.
61158084 10/1990 Japan.

OTHER PUBLICATIONS

Mueller, F. E., "Digital Demodulator for Quad-Burst Position Error Signal", IBM Technical Disclosure Bulletin, vol. 31, No. 9, Feb. 1989, pp. 159–160.

Primary Examiner—John Shepperd
Assistant Examiner—Le Thien Minh
Attorney, Agent, or Firm—Joan Pennington; Richard E. Billion; Pryor A. Garnett

[57] ABSTRACT

Apparatus and method are provided for servo signal demodulation using a servo processor and a partial-response maximum-likelihood (PRML) data channel in a disk file. A servo burst timing window is identified. Then a plurality of digital samples are detected with the PRML data channel responsive to identifying the servo burst timing window. Sequential sets of the detected digital samples are accumulated by the PRML data channel and transmitted to the servo processor. The digital samples are processed by the servo processor for providing servo phase information that is used to provide servo position information.

11 Claims, 8 Drawing Sheets

DIGITAL SERVO SIGNAL DEMODULATION METHOD AND APPARATUS UTILIZING A PARTIAL-RESPONSE MAXIMUM-LIKELIHOOD (PRML) CHANNEL IN A DISK FILE

BACKGROUND OF THE INVENTION

1. Field of the Invention

The invention relates generally to a direct access storage device (DASD) of the type including a partial-response maximum-likelihood (PRML) channel, and more particularly to a method and apparatus for servo signal demodulation utilizing the PRML channel.

2. Description of the Prior Art

Computers often include auxiliary memory storage units having media on which data can be written and from which data can be read for later use. Disk drive units incorporating stacked, commonly rotated rigid magnetic disks are used for storage of data in magnetic form on the disk surfaces. Data is recorded in radially spaced data information tracks arrayed on the surfaces of the disks. Transducer heads driven in a path toward and away from the drive axis write data to the disks and read data from the disks.

Figure 7:
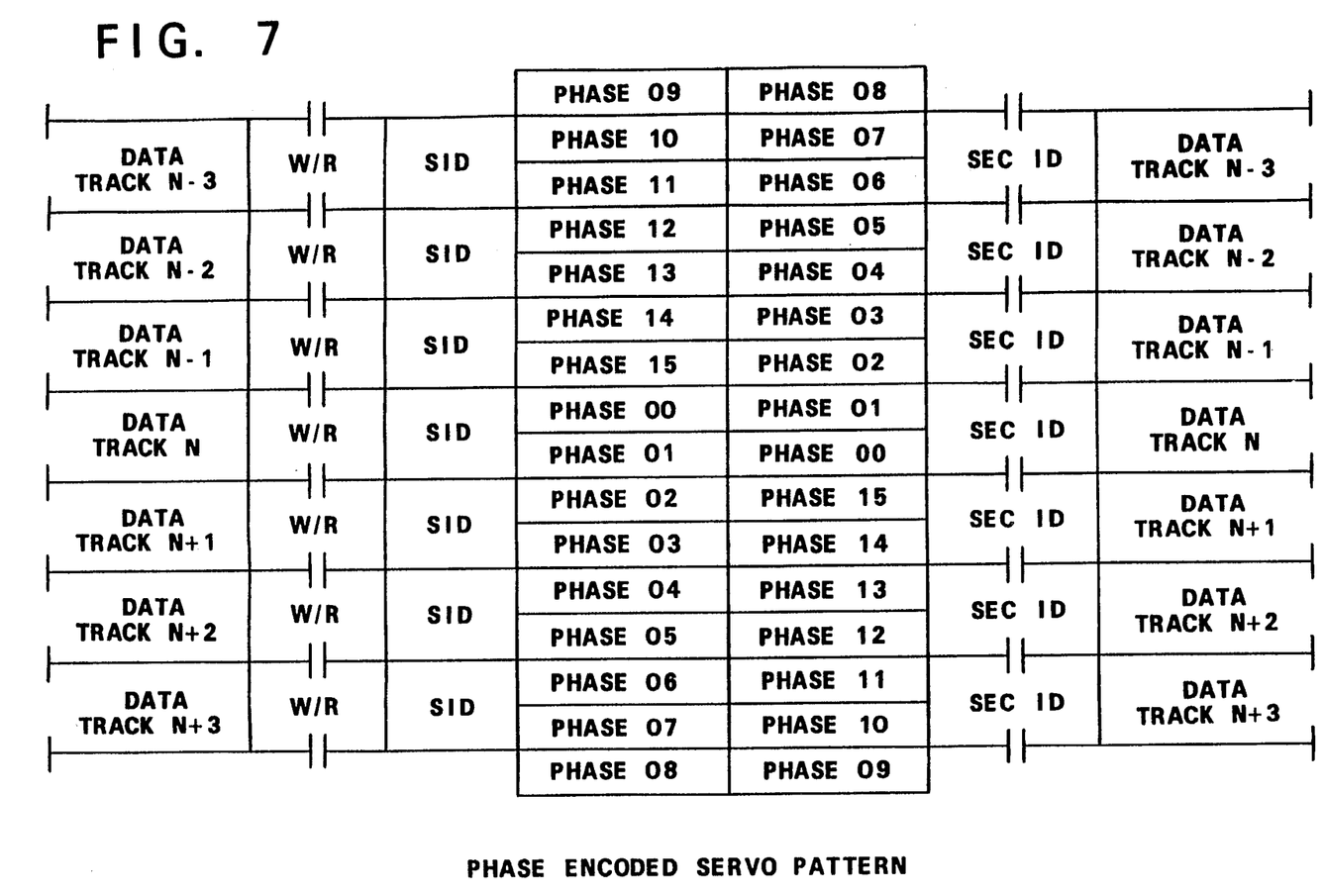
FIG. 7 is a graph illustrating an example of a phase encoded servo pattern format used with the present invention.

In direct access storage devices (DASD's), it is necessary to position the transducer heads over data tracks on the disk surfaces to properly record and retrieve data. One known method employs phase encoded signal bursts that are embedded within a particular format of information that is written on the disks, and are used by some form of phase demodulator to determine the relative position of a data head from a given data track. A typical phase demodulation system for a DASD file to compare the relationship of the servo phase bursts by measuring the relative phase difference between the phase bursts. Each of the consecutive phase bursts contain several cycles of a constant high frequency signal such that the phase difference can be integrated over the length of the burst to average out the effects of signal noise. An example of how these bursts can be formatted within each data sector in a sector servo format file is shown in FIG. 7, which shows two consecutive phase bursts written in the servo burst field. As shown in FIG. 7, the phase encoded servo pattern includes a write recovery field (W/R) and a servo identification (SID) which can identify track and sector types, for example, such as, index, non-index and guardband and to identify the start of the servo position error signal (PES) burst. The relative phase detected between the two burst fields is used to derive the positioning information.

Some implementations use more than two consecutive phase bursts in the servo burst field. However, some form of relative phase detection typically is made between the multiple bursts to derive the positioning information. The phase information is usually generated by analog circuits providing an analog voltage that represents the comparative phase difference between the bursts, which is in turn converted to a digital representation of the difference by an analog-to-digital (A/D) converter and then passed on to the digital servo processor which controls a voice coil motor (VCM) driven actuator to minimize any position error.

The traditional phase demodulation method often requires a significant amount of analog circuitry and componentry used only to derive positional information once every data sector time. The required analog detection circuitry is not available in a partial-response maximum-likelihood (PRML) data channel and must be constructed for the sole purpose of phase demodulation. This circuitry adds significant cost to a DASD file in terms of both expense and space required. Also, this circuitry is highly underutilized since it is only operational during the short servo information portion of each data sector. It is desirable to eliminate as much of this circuitry as possible by using other existing circuitry in the disk file to perform the same function.

One of the more important features to many customers of a DASD file is its cost. Therefore, it is desirable to provide alternative solutions for file functions when they can be provided at a cost savings. This is becoming more critical as DASD files continue to shrink in size so that space is available at a premium, and solutions are needed to either simplify or integrate the functions that make up a file. By combining the functions of the PRML channel more directly with the servo processor, an improved and practical cost saving solution is obtained for servo signal demodulation.

SUMMARY OF THE INVENTION

A principal object of the present invention is to provide an improved method and apparatus for digital servo signal demodulation in a PRML channel in a disk file. Other objects are to provide such digital servo signal demodulation method substantially without negative effects, and that utilizes signal processing elements available in a PRML channel; and that overcome many of the disadvantages of prior art arrangements.

In brief, the objects and advantages of the present invention are achieved by a method and apparatus for digital servo signal demodulation in a disk file including a partial-response maximum-likelihood (PRML) data channel and a servo processor. A servo burst timing window is identified and a plurality of digital samples are detected with the PRML data channel responsive to identifying the servo burst timing window. Sequential sets of the detected digital samples for phase burst are accumulated by the PRML data channel and transmitted to the servo processor. The digital samples are processed by the servo processor for providing servo phase information that is used to provide servo position information.

BRIEF DESCRIPTION OF THE DRAWING

The present invention, together with the above and other objects and advantages, may best be understood from the following detailed description of the embodiment of the invention illustrated in the drawings, wherein.

DETAILED DESCRIPTION OF THE PREFERRED EMBODIMENT

Figure 1:
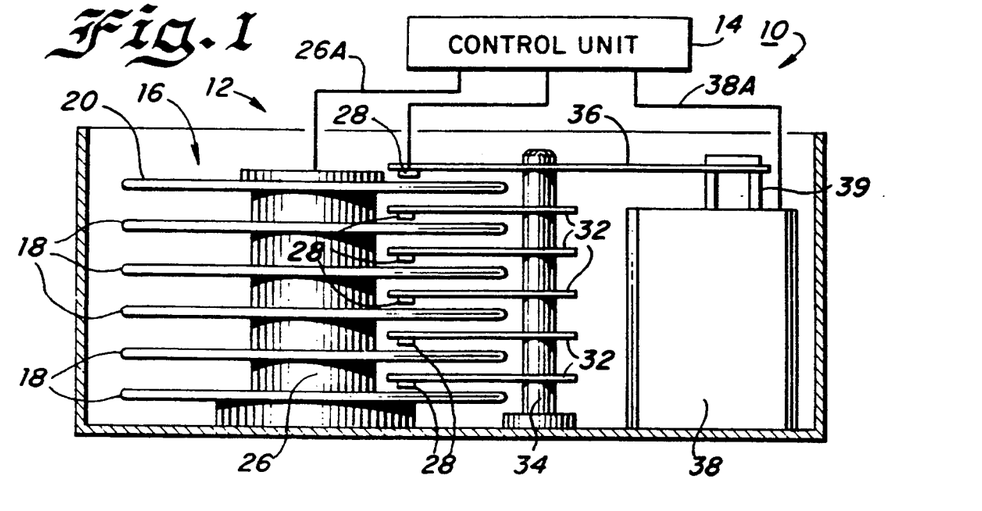
FIG. 1 is a schematic and block diagram of a data storage disk file embodying the present invention.

In FIG. 1 there is shown a partly schematic block diagram of parts of a data storage disk file 10 including a data storage medium generally designated as 12 and an interface control unit generally designated as 14. In the preferred embodiment of this invention, the data storage medium 12 is embodied in a rigid magnetic disk drive unit 12, although other mechanically moving memory configurations may be used. Unit 12 is illustrated in simplified form sufficient for an understanding of the present invention because the utility of the present invention is not limited to the details of a particular drive unit construction.

Figure 2:
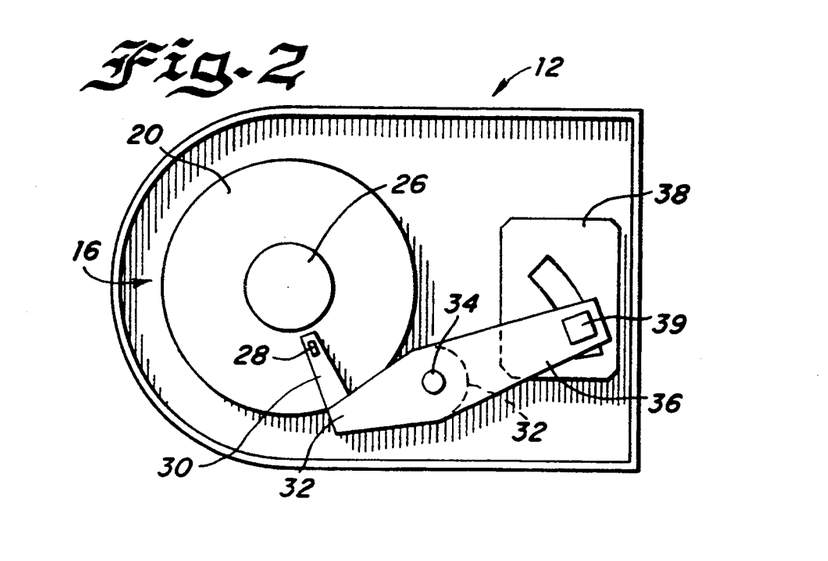
FIG. 2 is a diagram showing the accessing mechanism for a single disk surface of the apparatus of FIG. 1.

Referring now to FIGS. 1 and 2 of the drawings, disk drive unit 12 includes a housing and a stack 16 of disks 18 having at least one magnetic surface 20. The disks 18 are mounted in parallel for simultaneous rotation on and by an integrated spindle and motor assembly 26. Data information on each disk 18 are read and/or written to by a corresponding transducer head 28 movable across the disk surface 20.

Transducer heads 28 are mounted on flexure springs 30 carried by arms 32 ganged together for simultaneous pivotal movement about a support spindle 34. One of the arms 32 includes an extension 36 driven in a pivotal motion by a head drive motor 38. Although several drive arrangements are commonly used, the motor 38 can include a voice coil motor 39 cooperating with a magnet and core assembly (not seen) operatively controlled for moving the transducer heads 28 in synchronism in a radial direction in order to position the heads in registration with data cylinders to be followed. The VCM is movable within a fixed magnetic field, and the direction and velocity is controlled by the current supplied. The various components of the disk file 10 are controlled in operation by signals generated by control unit 14 such as motor control signals on line 26A and position control signals on line 38A.

Figure 3:
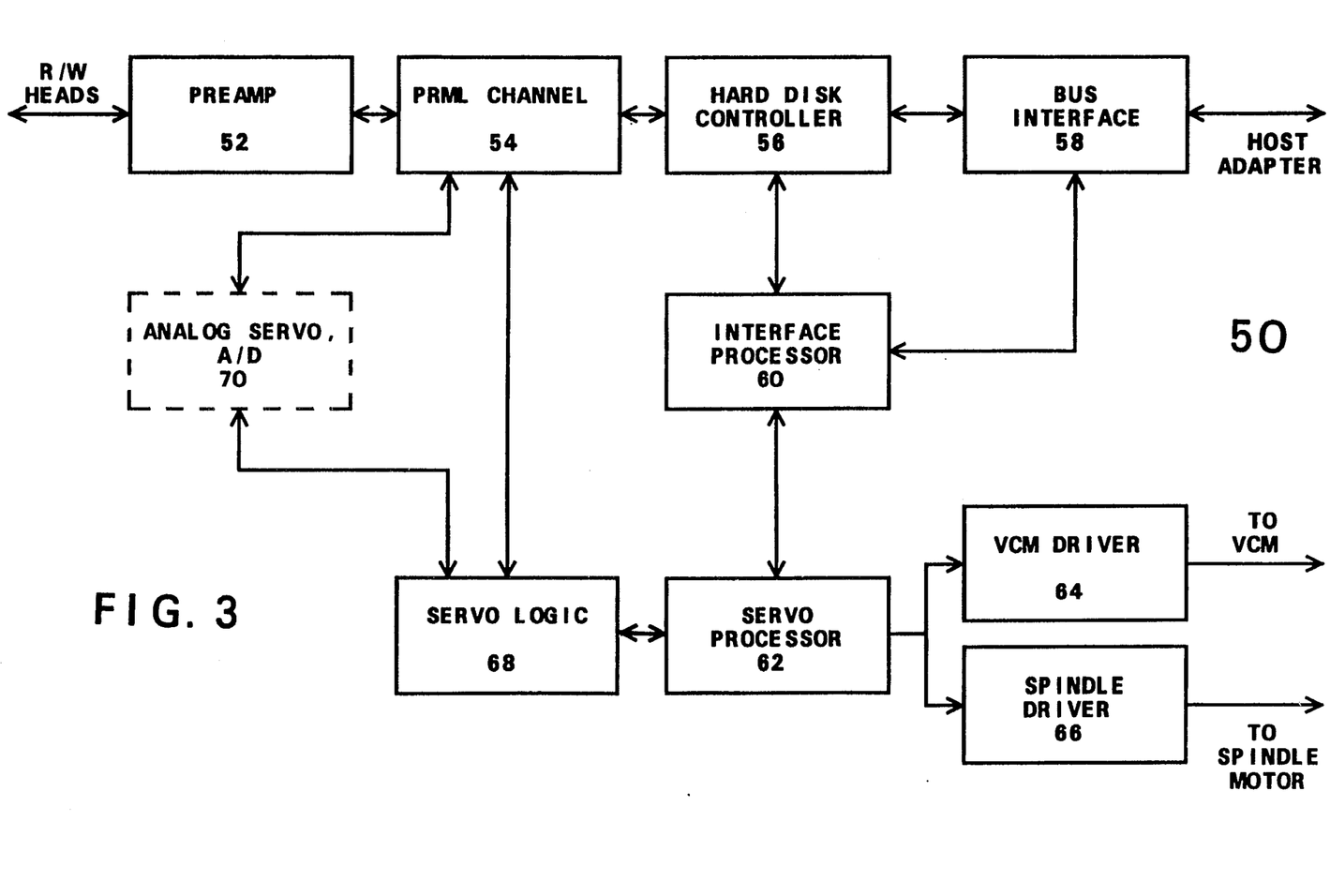
FIG. 3 is a block diagram functional representation illustrating the data storage disk file of FIG. 1.

Referring now to FIG. 3, there is shown a block diagram functional representation of the disk file 10 generally designated as 50 for carrying out the servo signal demodulation method of the invention. Servo information and customer data are read by the R/W heads 28 and amplified by a preamp 52. A PRML channel 54 uses digital sampling techniques for detecting the readback signals from the disk that contain the servo information and customer data. A hard disk controller 56 is coupled to the PRML channel 54 and a bus interface 58 that is coupled to a host adapter. An interface processor 60 coupled between the bus interface 58 and hard disk controller 56 and a servo processor 62 performs interface processor functions. The servo processor 62 performs servo control functions providing servo positioning control signals to a VCM driver 64 coupled to the VCM 39 and motor control signals to a spindle driver 66 coupled to the spindle motor 26. A servo logic block 68 provides timing information to the PRML channel 54 and provides an interface for the desired phase information to the servo processor 62 which controls the VCM driven actuator to minimize any position error. The basis for the method of the invention is to contain the complete demodulation process to digital signals after the initial sampling process of the PRML channel 54 by its A/D converter. This differs from the previous known methods of demodulation which essentially take analog samples and then average the analog samples before they are converted to digital signals. The invention eliminates the need for analog circuitry used for conventional phase demodulation methods shown in dotted line at block 70 labelled ANALOG SERVO, A/D.

In accordance with a feature of the present invention, servo signal demodulation is an integrated function of the partial-response maximum-likelihood (PRML) recording channel 54 and the servo processor 62 available in the disk file 10. The invention uses the digital sampling process of the PRML channel for the servo burst signals in addition to the customer data signals. Since the PRML channel is not being used for customer data during the servo information time, it is available for use with the servo demodulation process, thereby increasing its utilization and worth to the DASD or disk file 10.

If the PRML channel 54 incorporates a digital signal filter, also referred to as a partial-response digital filter (PRDF) channel, the digital filter can be used to further enhance the demodulation process by reducing signal noise such that the amount of integration or averaging required of the demodulator is reduced, and the length of the servo signal burst required can also be minimized. The digital signal filter is programmable and can be useful in optimizing the signal filtering for the demodulation process. Also, by filtering the servo burst signal digitally within the PRML channel 54 the amount of analog circuitry can be further reduced through the elimination of discrete analog signal filters.

The PRML based method used for phase demodulation consists of using discrete Fourier transform (DFT) techniques to derive Fourier coefficients of the servo burst signals, from which the phase of the servo signal with respect to a reference signal can be computed. A discrete Fourier series (DFS) description of a periodic discrete-time signal, x(n), generated by sampling a periodic continuous-time signal, can be provided by the PRML channel circuitry using an even number of discrete-time samples (N) in its fundamental period. There are two definitions for the DFS, one when N is even, and one when N is odd. Only the case for when N is even is described here; however, in both cases the following definitions apply:

N = The number of samples in the fundamental period;

M = N×L, where L = The number of periods to average;

k = The harmonic of interest; and n = The sample numbers within the period of interest.

For the N even case, the discrete Fourier series is generally defined as follows:

$$x(n) = a(0) + \sum_{k=1}^{N/2-1} a(k)\cos\left(\frac{2\pi k}{N} n\right) + \sum_{k=1}^{N/2-1} b(k)\sin\left(\frac{2\pi k}{N} n\right) + a(N/2)\cos(\pi n)$$

$$a(0) = \frac{1}{M} \sum_{n=0}^{M-1} x(n) \quad \{DC \text{ Term}\}$$

$$a(N/2) = \frac{1}{M} \sum_{n=0}^{M-1} x(n) \cos(\pi n) \quad \{\text{Nuquist Term}\}$$

-continued $$a(k) = \frac{2}{M} \sum_{n=0}^{M-1} x(n) \cos\left(\frac{2\pi k}{N} n\right), k = 1,2,3,\ldots,N/2 - 1$$

$$b(k) = \frac{2}{M} \sum_{n=0}^{M-1} x(n) \sin\left(\frac{2\pi k}{N} n\right), k = 1,2,3,\ldots,N/2 - 1$$

For the servo demodulation, only the Fourier coefficients of the servo burst at the fundamental frequency are obtained, that is, a(1) and b(1). The DC and Nyquist components do not contain any phase information at this frequency, and therefore are not computed.

There are a number of techniques that can be used to simplify the overall demodulation process by combining the processing power of the PRML channel 54 and the servo processor 62. First, the algorithm for computing the phase difference consists in part of taking the arctangent of the ratio of the two Fourier coefficients, a(1) and b(1). The ratio of the coefficients can be calculated quickly by most commercially available digital signal processors (DSP's) by implementing a divide routine in microcode, for example, 1.9 microseconds utilizing a Texas Instruments TMS320C25 for the servo processor 62 with a 100 ns cycle time. The arctangent can also be calculated by a DSP using a power series approximation, for example, a 7-term power series computation which takes 3.3 microseconds for the Texas Instruments TMS320C25 with a 100 ns cycle time. Less time would be required for a shorter power series. The computation for a(k) and b(k) shown above can be simplified and made very practical for the PRML circuits to compute by selecting N=8, and k=1. By selecting N=8 or greater, sufficient samples per period are provided for signals that are not purely sinusoidal or have some harmonic content. Also note that since the ratio of the two coefficients is being used, the 2/M factor ahead of the summation can be removed, such that only one divide operation is required per phase burst. By selecting N=8, the required multiplications can be performed by the servo processor so that the PRML channel is not required to perform multiplication. All that is required of the PRML channel 54 is to either add or subtract the successive samples of a servo burst into one of two accumulators for each Fourier coefficient, and pass these values on to the servo processor after they have been obtained.

Figure 4:
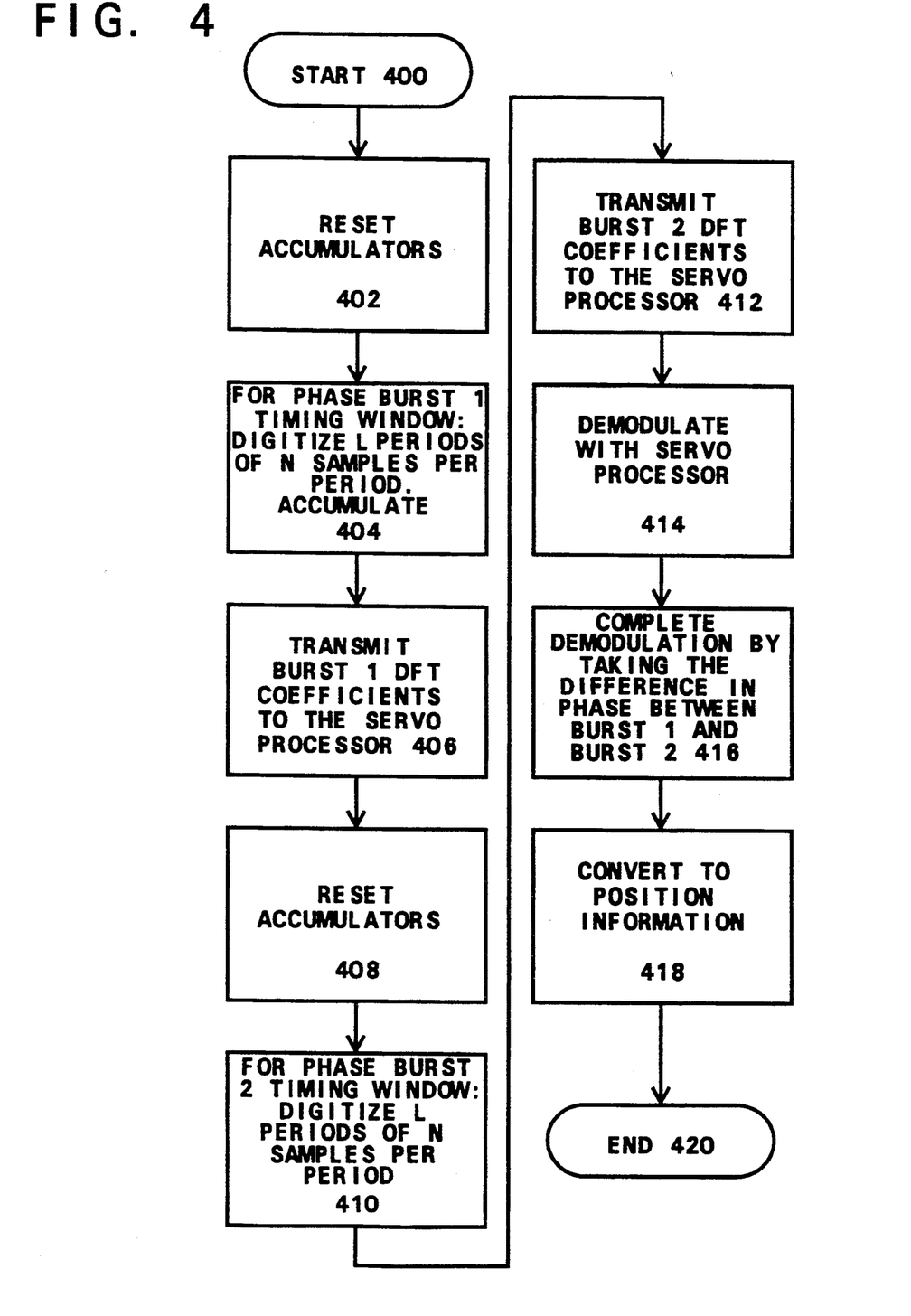
FIGS. 4, 4A, 4B, 5A, 5B, 5C and 6 are logic diagrams illustrating the digital servo signal demodulation method and apparatus of the invention.

Referring now to FIG. 4, there is shown a general flowchart that describes required operations based on a servo pattern format as shown in FIG. 7. FIG. 4 illustrates only one possible method for the digital demodulation process. The sequential operation starts at block 400. First the accumulators are reset as indicated at a block 402. Then with respect to phase Burst 1 timing window, a predetermined number of periods (L) of N samples per period are digitized and accumulated as indicated at a block 404. Digitization and accumulation of each sample in a respective DFT coefficient accumulator is illustrated and described with respect to FIGS. 5A, 5B, 5C. Next the Burst 1 DFT coefficients from the digitizing channel are transmitted to the servo processor as indicated at a block 406 and the accumulators are reset as indicated at a block 408. Then, with respect to phase Burst 2 timing window, the predetermined number of periods L of N samples per period are digitized and accumulated as indicated at a block 410. Next the Burst 2 DFT coefficients from the digitizing channel are transmitted to the servo processor as indicated at a block 412. The servo processor demodulates as indicated at a block 414. The demodulation process is illustrated and described in detail with respect to FIGS. 4A and 6. Then the demodulation process is completed by taking the difference in phase between Burst 1 and Burst 2 as indicated at a block 416. Then the phase difference is converted to position information as indicated at a block 418 to end the demodulation process at a block 420.

Figure 4A:
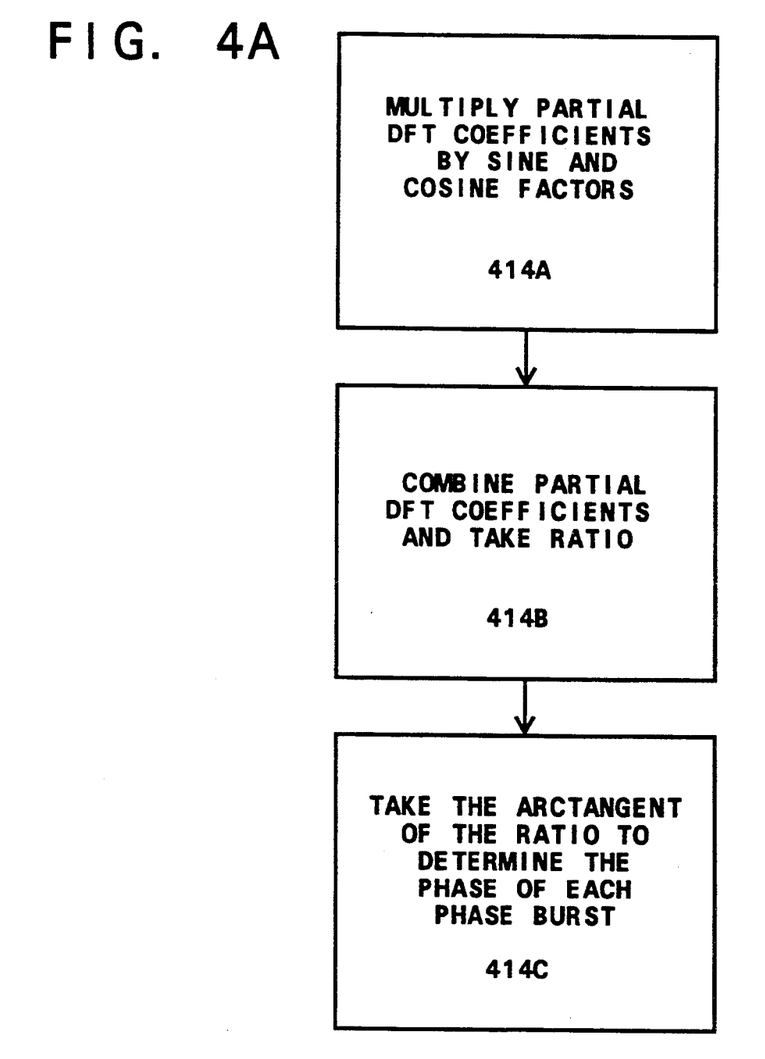

FIG. 4A illustrates details of the flowchart block 414 of FIG. 4 in which the phase bursts are demodulated by the servo processor 62. As shown in FIG. 4A, first the partial DFT coefficients are multiplied by sine and cosine factors as indicated at a block 414A. Then the partial DFT coefficients are combined and a ratio is taken as indicated at a block 414B. Then the arctangent of the ratio is taken to determine the phase of each phase burst as indicated at a block 414C.

Figure 4B:
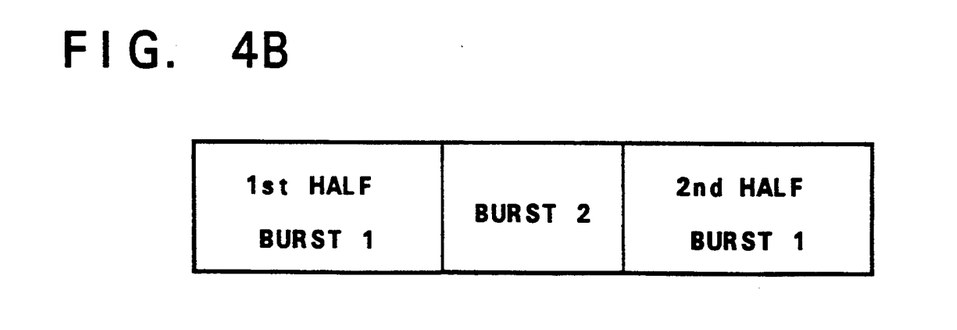

It should be understood that it is not required that the bursts be transmitted at the times shown in the flowchart of FIG. 4. For example, the Burst 1 coefficients could be stored until the Burst 2 coefficients are completed, and then both sets of coefficients could be transmitted at the same time. The preferred embodiment is illustrated in FIG. 4B where Burst 1 is split and arranged to encompass Burst 2, in which case the Burst 2 coefficients become available before the second half of the Burst 1 coefficients. In this case the Burst 2 coefficients may be transmitted while the second half of Burst 1 is being processed, or they may be stored and transmitted after Burst 1 is completed. An advantage of the sampling arrangement illustrated in FIG. 4B is that it provides compensation for minor frequency shifts between the bursts and the demodulator.

Figure 5A:
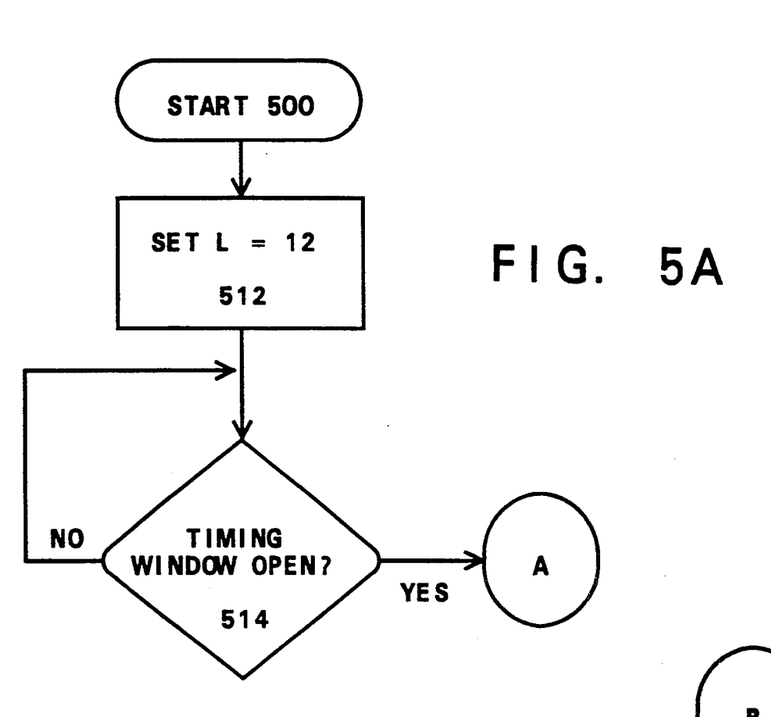
Figure 5B:
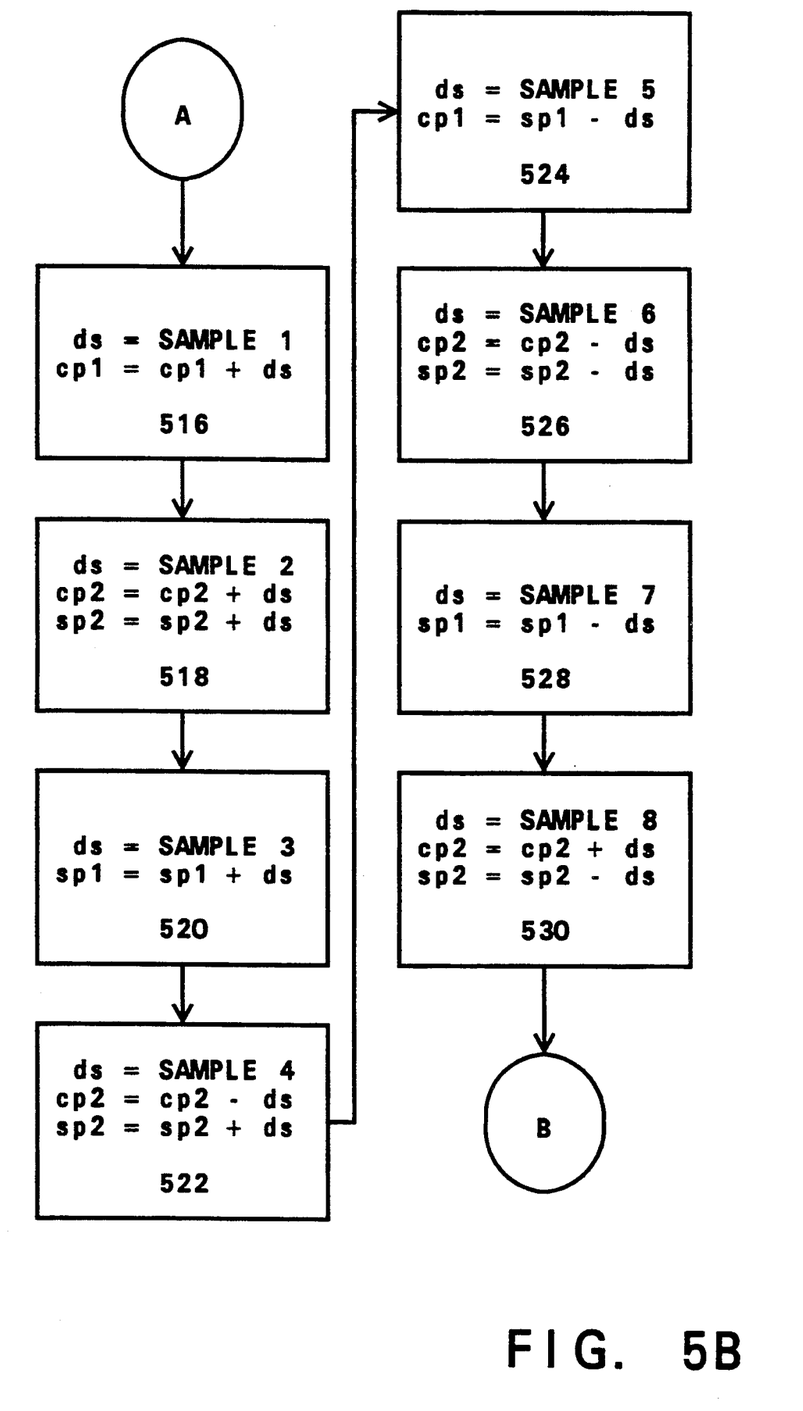
Figure 5C:
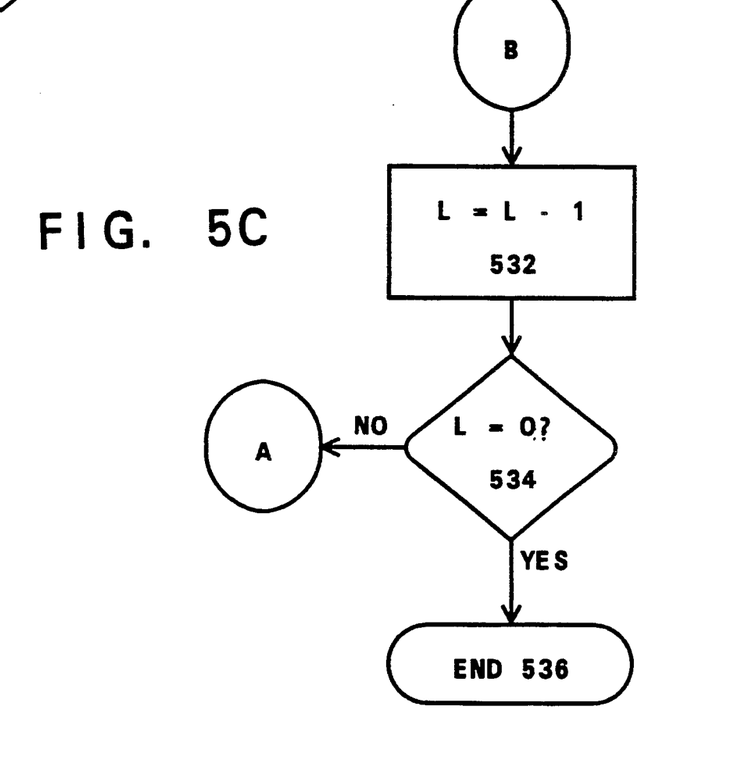

FIGS. 5A, 5B and 5C together provide a flowchart illustrating details of the block 404 of FIG. 4 in which the phase bursts are digitized and the values are accumulated in partial sum accumulators for the DFT coefficients. This flowchart depicts a particular example where each phase burst is digitized at a rate of eight samples per period over a total of twelve periods for a total of ninety-six samples per phase burst. It should be understood that other digitizing rates and number of periods of sampling can be used.

In FIG. 5A the sequential operation starts at a block 500 and L is set equal to 12 periods as indicated at a block 512. Then a phase burst timing window is checked as indicated at a decision block 514. When the phase burst timing window is open, the sequential operation continues following entry point A in FIG. 5B.

As shown in FIG. 5B, for each phase burst that is digitized, there are four partial sum accumulators that are used to accumulate and store the digitized values including a cp1 partial sum accumulator for cosine term, +/−1 factor, cp2 partial sum accumulator for cosine term, +/−1/sqrt(2) factor, sp1 partial sum accumulator for sine term, +/−1 factor, and sp2 partial sum accumulator for sine term, +/−1/sqrt(2) factor, and the digitized sample of the phase burst is represented by ds. The two sine term accumulators sp1, sp2 and two cosine term accumulators cp1, cp2 accommodate the nonzero DFT multiplication factors that are part of the DFT process. For example, for N=8 in a normal DFT operation, the digitized samples would be multiplied by the multiplication factors shown below in TABLE 1 as n steps from 0 to N−1 shown in the first line, the cosine factor in the second line and the sine factor in the third line. Separate accumulators sp1, sp2, cp1 and cp2 are provided to speed up the process by not having to multiply and accumulate for each sample.

TABLE 1

| 0 | 1     | 2 | 3      | 4  | 5      | 6  | 7      |
|---|-------|---|--------|----|--------|----|--------|
| 1 | .7071 | 0 | −.7071 | −1 | −.7071 | 0  | +.7071 |
| 0 | .7071 | 1 | +.7071 | 0  | −.7071 | −1 | −.7071 |

Partial sums are accumulated for each sample 1 though sample 8 as indicated at sequential blocks 516, 518, 520, 522, 524, 526, 528 and 530. As shown in the blocks 516, 520, 524 and 528, when the multiplication factor is zero, there is no need to accumulate these values so that only the nonzero term is accumulated.

It is much simpler, faster and less expensive from the standpoint of silicon real estate and power dissipation to simply accumulate the samples into their respective partial sum accumulators or buckets and perform only one multiplication after the accumulations are complete. This also provides for greater numeric resolution and accuracy. This eliminates the need for a multiplier in the PRML channel 54 since the servo processor 62 can easily perform a 1/sqrt(2) multiplication after receiving the partial sums.

Referring now to FIG. 5C, following entry point B, the value L is decremented by 1 as indicated at a block 532 and then compared to 0 as indicated at a decision block 534 labelled L=0?If not, then the sequential operations are repeated by returning to entry point A in FIG. 5B. If yes, then the sequential steps end at a block 536.

Figure 6:
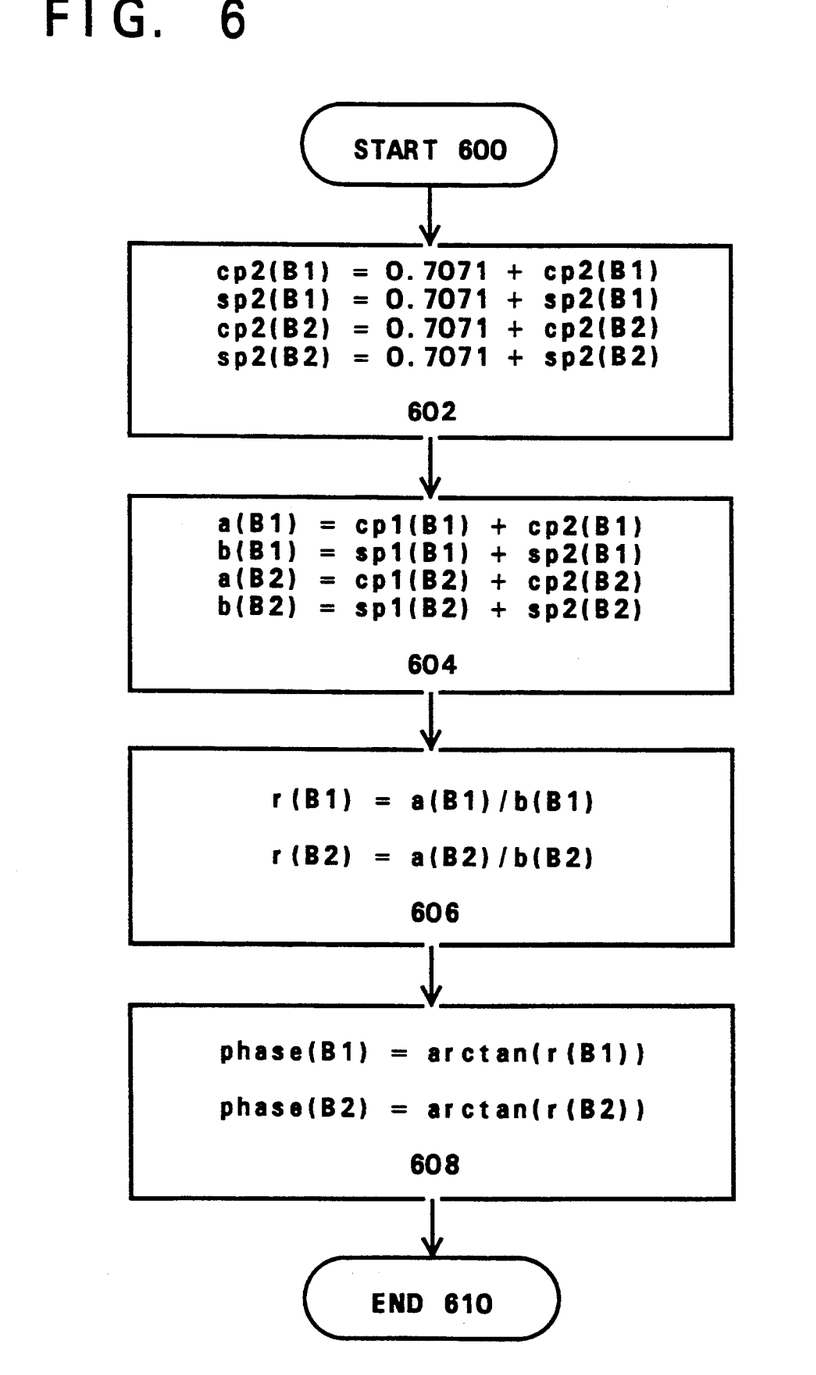

FIG. 6 illustrates details of the flowchart block 414 of FIG. 4 in which the phase bursts are demodulated by the servo processor 62. In FIG. 6, B1 represents the value for phase burst 1, B2 represents the value for phase burst 2, a(Bx) represents the cosine coefficient for phase burst x, b(Bx) represents the sine coefficient for phase burst x, r(Bx) represents the ratio of DFT coefficients for phase burst x, and phase (Bx) represents the phase of phase burst x.

As shown in FIG. 6, the sequential operations begin at a block 600 and then the partial DFT coefficients are multiplied by sine and cosine factors as indicated at a block 602. Next the partial DFT coefficients a(B1), b(B1), a(B2) and b(B2) are combined as indicated at a block 604. Next ratios r(B1), r(B2) of the combined partial DFT coefficients are taken as indicated at a block 606. Then the arctangent of the ratio is taken to determine the phase, phase(B1), phase(B2), of each phase burst as indicated at a block 608.

What is claimed and desired to be secured by Letters Patent of the United States is:

We claim:

1. A method of servo signal demodulation using a servo processor and a digitizing data channel in a disk file, said method comprising the steps of:
   identifying a servo burst timing window with the digitizing data channel;
   detecting a plurality of digital samples with the digitizing data channel responsive to identifying said servo burst timing window;
   accumulating sequential sets of said detected digital samples with the digitizing data channels;
   transmitting said accumulated digital samples to the servo processor;
   processing said digital samples with the servo processor for providing servo phase information; and
   converting said servo phase information to position information for providing position control signals for the disk file.

2. A method as recited in claim 1 wherein the step of accumulating sequential sets of said detected digital samples with the digitizing data channel includes the steps of:
   sequentially identifying a predetermined number of periods; and
   accumulating sequential sets of said detected digital samples within each of said sequentially identified periods.

3. A method of servo signal demodulation using a servo processor and a digitizing data channel in a disk file, said method comprising the steps of:
   identifying a servo burst timing window with the digitizing data channel;
   detecting a plurality of digital samples with the digitizing data channel responsive to identifying said servo burst timing window;
   accumulating sequential sets of said detected digital samples with the digitizing data channels;
   transmitting said accumulated digital samples to the servo processor;
   processing said digital samples with the servo processor for providing servo phase information; and
   converting said servo phase information to position information for providing position control signals for the disk file; and
   wherein the step of accumulating sequential sets of said detected digital samples with the digitizing data channel includes the steps of:
   sequentially identifying a predetermined number of periods; and
   accumulating sequential sets of said detected digital samples within each of said sequentially identified periods; and
   wherein L sequential periods are identified and further includes the steps of:
   providing a plurality of partial sum accumulators;
   detecting a predetermined number N of samples within each of said L sequential periods; and
   accumulating predetermined sine terms in predefined sets of said partial sum accumulators and accumulating predetermined cosine terms in other sets of said partial sum accumulators.

4. A method as recited in claim 8 includes the step of:
   detecting a predetermined number N of samples within each of the L sequential periods, wherein N is greater than or equal to 8.

5. A method of servo signal demodulation using a servo processor and a digitizing data channel in a disk file, said method comprising the steps of:
   identifying a servo burst timing window with the digitizing data channel;
   detecting a plurality of digital samples with the digitizing data channel responsive to identifying said servo burst timing window;
   accumulating sequential sets of said detected digital samples with the digitizing data channels;
   transmitting said accumulated digital samples to the servo processor;
   processing said digital samples with the servo processor for providing servo phase information; and
   converting said servo phase information to position information for providing position control signals for the disk file; and wherein said step of processing said digital samples with the servo processor for providing servo phase information includes the steps of:

selectively multiplying sequential sets of said digital samples by predetermined sine and cosine factors combining said resultant sample values;

calculating ratios of said combined sample values; and calculating the arctangent of said calculated ratios to determine the phase of each phase burst.

6. Apparatus for demodulating a servo signal in a disk file comprising:

a digitizing data channel including;

means for identifying a servo burst timing window;

means for detecting a plurality of digital samples responsive to said servo burst timing window identifying means;

means for accumulating sequential sets of said detected digital samples and means for transmitting said accumulated digital samples to a servo processor;

said servo processor including means for processing said accumulated digital samples for providing servo phase information; and means for converting said servo phase information to position information for providing position control signals for the disk file.

7. Apparatus for demodulating a servo signal in a disk file comprising:

a digitizing data channel including;

means for identifying a servo burst timing window;

means for detecting a plurality of digital samples responsive to said servo burst timing window identifying means;

means for accumulating sequential sets of said detected digital samples and means for transmitting said accumulated digital samples to a servo processor;

said servo processor including means for processing said accumulated digital samples for providing servo phase information;

means for converting said servo phase information to position information for providing position control signals for the disk file; and wherein said digitizing data channel includes:

means for accumulating discrete Fourier transform coefficients of first and second servo bursts of the servo signal.

8. Apparatus as recited in claim 7 wherein said servo signal processor means include:

means for selectively multiplying sequential sets of said digital samples by predetermined sine and cosine factors;

means for combining said resultant sample values;

means for calculating ratios of said combined sample values; and means for calculating the arctangent of said calculated ratios to determine the phase of each phase burst.

9. Apparatus as recited in claim 8 wherein said servo signal processor means include means responsive to said arctangent calculating means for providing position information.

10. Apparatus as recited in claim 6 wherein said accumulating means include a plurality of partial sum accumulators.

11. A direct access storage device of the type including a digitizing data channel comprising:

a housing;

at least one disk mounted in said housing for rotation about an axis and having at least one disk surface for storing data;

transducer means mounted for movement across said disk surface for reading and writing data and predefined types of servo identification patterns to said disk surface;

said digitizing data channel coupled to said transducer means for providing digital sample values; and said digitizing data channel including;

means for identifying a servo burst timing window;

means for detecting a plurality of digital samples responsive to said servo burst timing window identifying means;

means for accumulating sequential sets of said detected digital samples and means for transmitting said accumulated digital samples to a servo processor; and said servo processor including means for processing said accumulated digital samples for providing servo phase information; and means for converting said servo phase information to position information for positioning said transducer means.

* * * * *